United States Patent [19]
Anderson et al.

[11] Patent Number: 5,815,733
[45] Date of Patent: Sep. 29, 1998

[54] SYSTEM FOR HANDLING INTERRUPTS IN A COMPUTER SYSTEM USING ASIC RESET INPUT LINE COUPLED TO SET OF STATUS CIRCUITS FOR PRESETTING VALUES IN THE STATUS CIRCUITS

[75] Inventors: Eric C. Anderson; Celeste Johnson, both of San Jose, Calif.

[73] Assignee: Apple Computer, Inc., Cupertino, Calif.

[21] Appl. No.: 595,493

[22] Filed: Feb. 1, 1996

[51] Int. Cl.$^6$ ................................. G06F 9/00; G06F 9/46
[52] U.S. Cl. ........................... 395/868; 395/866; 395/856
[58] Field of Search ............................... 395/860, 866, 395/867, 868, 856

[56] References Cited

U.S. PATENT DOCUMENTS

| | | | |
|---|---|---|---|
| 5,003,462 | 3/1991 | Blaner et al. | 364/200 |
| 5,133,056 | 7/1992 | Miyamori | 395/275 |
| 5,410,708 | 4/1995 | Miyamori | 395/725 |
| 5,481,724 | 1/1996 | Heimsoth et al. | 395/200.01 |
| 5,542,076 | 7/1996 | Benson et al. | 395/733 |
| 5,615,375 | 3/1997 | Ibusuki et al. | 395/737 |
| 5,630,152 | 5/1997 | DeLuca et al. | 395/800 |
| 5,640,571 | 6/1997 | Hedges et al. | 395/734 |

*Primary Examiner*—Thomas C. Lee
*Assistant Examiner*—Rehana Perveen
*Attorney, Agent, or Firm*—Carr & Ferrell LLP

[57] ABSTRACT

The present invention provides an interrupt register for handling interrupt requests received from external devices at a common interrupt terminal of a CPU. The invention provides inputs, outputs, and storage means as part of the interrupt register. The interrupt register inputs and outputs are used for communication with both the external devices and CPU to prevent mishandling of the interrupt requests.

20 Claims, 10 Drawing Sheets

SYSTEM FOR HANDLING INTERRUPTS IN A COMPUTER SYSTEM USING ASIC RESET INPUT LINE COUPLED TO SET OF STATUS CIRCUITS FOR PRESETTING VALUES IN THE STATUS CIRCUITS

BACKGROUND OF THE INVENTION

1. Field of the Invention

The present invention relates generally to devices for handling communications associated with interrupts in a computer system. More particularly, the present invention relates to an apparatus and method for handling interrupts and communications using an interrupt register in a multi-threaded computer system environment. The invention functions to prevent computer system errors caused by the communication of hardware and software devices with the interrupt register.

2. Background

Computer systems are typically connected to a wide range of peripheral devices. In order for these devices to function as intended they require a method of communication with the computer system microprocessor. This microprocessor is equivalently called "the CPU."

For illustration, the interaction of a peripheral keyboard device will be used to explain the type of communication that occurs when a peripheral device "talks" to the CPU. During normal operation of a computer system, the CPU is constantly processing internal software commands. When an external event such as a user initiated keyboard input occurs, a mechanism is needed to "interrupt" the CPU so that input from the keyboard can be decoded by the computer system. Upon receiving an interrupt signal, the CPU should stop its routine processing, service the interrupting signal, and then return to the pre-interrupt processing.

A typical computer system will have a set of interrupt request lines. If the CPU detects an interrupt signal at one of these interrupt request lines, the CPU will complete its current software instruction and then stop its normal operation. Such an interrupt can be generated by the keyboard in response to user initiated keypad input. The CPU will then jump to a software routine stored in memory, hereinafter to be called an "Interrupt Service Routine" or "ISR." Depending on which interrupt request line of the CPU receives the interrupt signal, the CPU determines a jump location and then begins execution of an ISR located at that memory location. In our example, the ISR may deal with displaying keyboard input on the computer system display. Interrupt Service Routines may be considered as being device specific software programs that integrate the operation of peripheral devices and normal CPU operation. At the end of the Interrupt Service Routine (ISR) the ISR sends a command to the CPU to restore the pre-existing condition of the CPU. Thus in a general sense, interrupts enable transfer of control from one program to another, to be initiated by an event external to the computer. Since interrupts can occur at any time, they may alter the execution of events by the CPU, creating interactions between software and hardware that were not anticipated in the design of the computer system.

There are many situations in which the CPU should ignore interrupt requests. For example, it may be necessary to guarantee that a particular sequence of instructions is executed to the end without interruption, since the Interrupt Service Routine may change some of the data used by the instructions in question. For this reason some means must be made available to disable potential interrupts in these scenarios. This is usually provided for by using a software "interrupt disable command" within the Interrupt Service Routines and operating system software.

An interrupt request may originate from two types of devices. The first type of device, defined as a "Type 1" device, generates an interrupt event that does not need to be cleared. For example, in a Real Time Clock (RTC), the interrupt events generated are pulses and are inherently self resetting. As a result, the RTC does not require servicing to clear or reset the interrupt event. The second type of device, defined as a "Type 2" device, generates an interrupt event that requires an action to be performed on the device generating the event. An example of a Type 2 device is a keyboard which by pressing a key causes a level shift signal to be generated. The level shift signal remains at a predetermined level until the keyboard is serviced by an ISR to determine which key was pressed. The interrupt event is then cleared by resetting it's signal level to allow the occurrence of another keyboard generated event to be processed.

To ensure proper computer system operation it is necessary to make sure that the device generating the interrupt event is serviced and cleared before a 2nd subsequent interrupt event is generated by the device. If only one interrupting device is generating interrupts, one mechanism to prevent the generation of the 2nd interrupt is to use an interrupt disable command as the first instruction of the ISR. The interrupt would then be re-enabled before returning from the interrupt. Another option is to have the CPU automatically disable the interrupts before starting the execution of the ISR. A third option uses the already mentioned level transition interrupt where the interrupt detecting hardware detects only the edge of the interrupt transition, so that only one such transition is seen for each interrupt.

If more than one device is connected to the CPU, a situation arises in which more than one device may request an interrupt during the same time interval. These interrupts may occur at separate input terminals or one common CPU interrupt input terminal. In addition, the system design must take into account how to recognize which device is requesting the interrupt, how the CPU will determine which ISR to run for each device, which device should be allowed to interrupt the CPU while another interrupt is being serviced, and how two interrupts occurring at the same time can be handled.

In the simplest case, external devices connected to one CPU interrupt terminal are identified by their locations or addresses in the memory map of the computer system. The device interrupt outputs can be connected to the inputs of an OR circuit. The output of the circuit transmits the device interrupt requests to the CPU interrupt terminal. Because the output of the OR circuit is essentially shared by the devices requesting interrupts, there could always be another device interrupting on the same line without the CPU knowing about it. A solution to this problem has used a method where status registers, physically located on each of the connected devices, are set by a corresponding interrupt request signal. The outputs of the individual status registers are OR'ed to indicate the presence of interrupt signals. During an active interrupt, if an interrupt request is signaled by another device, the request is stored in the associated status register. Upon completing the servicing of the first interrupt, the second interrupting device will still be indicating the interrupt status of the second device at the OR circuit output. The computer system can reset these registers to clear the interrupts by writing to the individual address location identifying the register. Depending on the number of interrupting devices, this method may require a large number of computer system address locations. This in turn can increase the complexity of the decoding scheme used in the CPU architecture. Another disadvantage of using such an implementation is the time required for polling the registers to determine their status. An alternative design is for the device to send a code or "vector" along with its interrupt signal. The CPU can then immediately start executing the ISR pointed to by the code. In a computer which has multiple interrupt-request lines, vectored interrupts may be implemented by simply associating a unique starting address with each line. The two alternatives can be mixed; the vectors can identify groups of inputs from which the CPU can identify a particular one by polling.

A problem associated with both approaches is that there are inherent delays in the processing of interrupts. These delays can cause a subsequent interrupt to be missed. One such delay results from the necessity in some computer systems to globally disable interrupts upon a valid interrupt request. During this period, until re-enablement of the interrupts, other interrupting devices cannot be identified. Computer system delays can arise during critical sequences when interrupts are disabled during the time required to poll the interrupting devices, the time required to complete the current CPU instruction sequence before jumping to the interrupt, and due to the necessity to process higher priority interrupts first. Since the CPU may require the use of the system bus to process its normal functions during this delay, the interrupting device should not be allowed to put data on the bus until the CPU is ready to receive it. This can be achieved through the use of additional control signals. As soon as the CPU is ready to service the interrupt, it asserts a control signal. This in turn causes the requesting device to communicate the interrupt.

It was previously stated that interrupts from peripherals are usually disabled during the execution of an ISR. This ensures that an interrupt request from one device will not cause more than one interruption. The same arrangement is often used when several interrupting devices are involved, in which case execution of a given ISR will continue to completion before a second interrupt is accepted by the CPU. The delay created by the disabled interrupts can lead to erroneous operation. To reduce the possibility of erroneous operation of interrupting devices the devices can be organized in a hierarchical priority structure called a "priority interrupt system".

In a priority interrupt system, interrupt requests will be accepted from some devices but not from others, depending on the priority of the device. From a hardware point of view this can be implemented using separate interrupt-request lines that are arbitrated by a priority circuit such as a priority encoder. A request is accepted only if it has a higher priority level than a currently interrupting device. A disadvantage of such a system is that typically there may be more devices than available input terminals, and that the priorities of the devices cannot be changed once they are connected to the prioritized inputs.

To deal with the problem of simultaneous arrivals of interrupt requests from two or more devices, the CPU should have means for determining which request is serviced and which others are either delayed or ignored. With the use of a priority encoder the CPU simply accepts the request having the highest priority. When a polling scheme is used, a priority is automatically implemented by the order in which the devices are polled. In the case of vectored interrupts the priority of any device is usually determined physically by the physical order the interrupting devices are connected to the CPU, called "daisy chaining." The interrupt request line is common to the peripheral devices which are in turn connected in a serial fashion along the interrupt line. The highest priority device is connected electrically closest to the CPU, so that an interrupt request from that device will be sensed first by the CPU.

So far, interrupts in a conventional computer system running one program have been discussed. There are computer systems that are capable of executing 2 or more programs while sharing the resources of one CPU. This type of computer system is referred to as a "multi-tasking" computer system environment. What this means is that the programs are taking turns; one program runs for a while then another. Since there is only one CPU, the programs cannot physically use the CPU resources at the same time. Since these CPU's are typically performing the sharing very quickly, it appears to the user that the two programs are running at the same time.

Multi-tasking is an event driven environment in which the events are timer based interrupts and external device interrupts. This means that the programs share resources based on the events that take place. Normally, a program is allowed to complete a task, such as a calculation, before relinquishing the resource to another program that is waiting for it. The CPU implements multiprocessing through a system of interrupts that interact with the interrupt sensing hardware that is very similar to that already discussed.

A further level of interrupt interaction occurs in "multi-threaded" operation in a multitasking system. Multithreading can allow individual chores within a program to run at the same time whether or not more than one program is running simultaneously. A multithreaded graphics system might have a thread that accepts commands from the keyboard while another thread draws a picture on the screen. Each of these threads may be receiving its own interrupts. Thus, the requirements of multi-threaded computer system environments require further consideration when attempting to handle interrupt requests from multiple devices.

The problems associated with the handling of interrupts can occur using the previously discussed interrupt sensing hardware during a read-write cycle. During a typical read-write cycle, the outputs of the interrupt sensing hardware are first read for indications of an occurrence of an interrupt. Subsequent to the read-operation, a write-operation is performed to remove or mask the particular interrupt condition from the interrupt sensing hardware outputs and to preserve the status of any other outputs present at the time of the read-operation. The other output conditions are thus saved for future processing using another read-write cycle. During the read-write cycle, between the read and subsequent write-operation, additional interrupt events may occur and be indicated at the outputs of the interrupt sensing hardware. If the subsequent write-operation takes place after the occurrence of the additional interrupt events, the additional events can be over-written with the subsequent write-operation, by the output information present at the time of the read-operation. Thus, the occurrence of an additional interrupt event during a read-write cycle can result in the computer system missing the occurrence of the event.

Another problem relates to multi-threaded ISR operation. A lower priority ISR may be interrupted, during its read-write operation of the interrupt sensing hardware, by an interrupt directed to a higher priority ISR. If the interrupt sensing hardware is shared between the two devices, the changes by the higher priority ISR, to the interrupt sensing hardware, may be destroyed on the completion of a write by the lower priority ISR.

What is needed is an apparatus and method that improves upon the deficiencies of the prior art. The apparatus and method should provide means for processing interrupts from multiple hardware devices and multiple software threads without mishandling the interrupt action requested.

SUMMARY OF THE INVENTION

The present invention provides an apparatus and method for handling interrupt signals communicated between peripherals and a control device, such that the status of any given interrupt signal is not lost or mishandled. The apparatus comprises a circuit having a first interrupt input for receiving interrupt signals from a peripheral; additional inputs for receiving control device; storage means for storing an interrupt signal occurrence indication; a first output at which the interrupt signal occurrence indication is presented; and additional outputs for indicating a circuit condition corresponding to a particular combination of control signals received from the control device. The circuit can preferably receive interrupt signals comprising signal pulses, or a signal that changes from one constant level to a second constant level.

The apparatus preferably comprises a plurality of such circuits, each of which has an interrupt input terminal for receiving an interrupt signal from a peripheral, storage means for storing a respective indication of an occurrence of the interrupt signal, and an output for signaling the stored occurrence of the interrupt signal. Each of the circuits has additional input terminals for receiving control signals from the control device.

Each circuit of the present invention can preferably receive an interrupt signal from a peripheral that comprises signal pulses, or a signal that changes from one constant level to a second constant level. More than one circuit can receive an interrupt signal at any given time.

The present invention can preferably be used with control device bits that communicate the control signals to the input terminals of the circuits. The bits are used to individually address each circuit, to ensure that occurrences of interrupt signals from the peripherals are not incorrectly processed or lost.

DETAILED DESCRIPTION OF THE INVENTION

The present invention, An Apparatus And Method For Handling Interrupts, prevents potential computer system conflicts caused by software and hardware interactions with computer system microprocessor interrupt registers.

Figure 1:
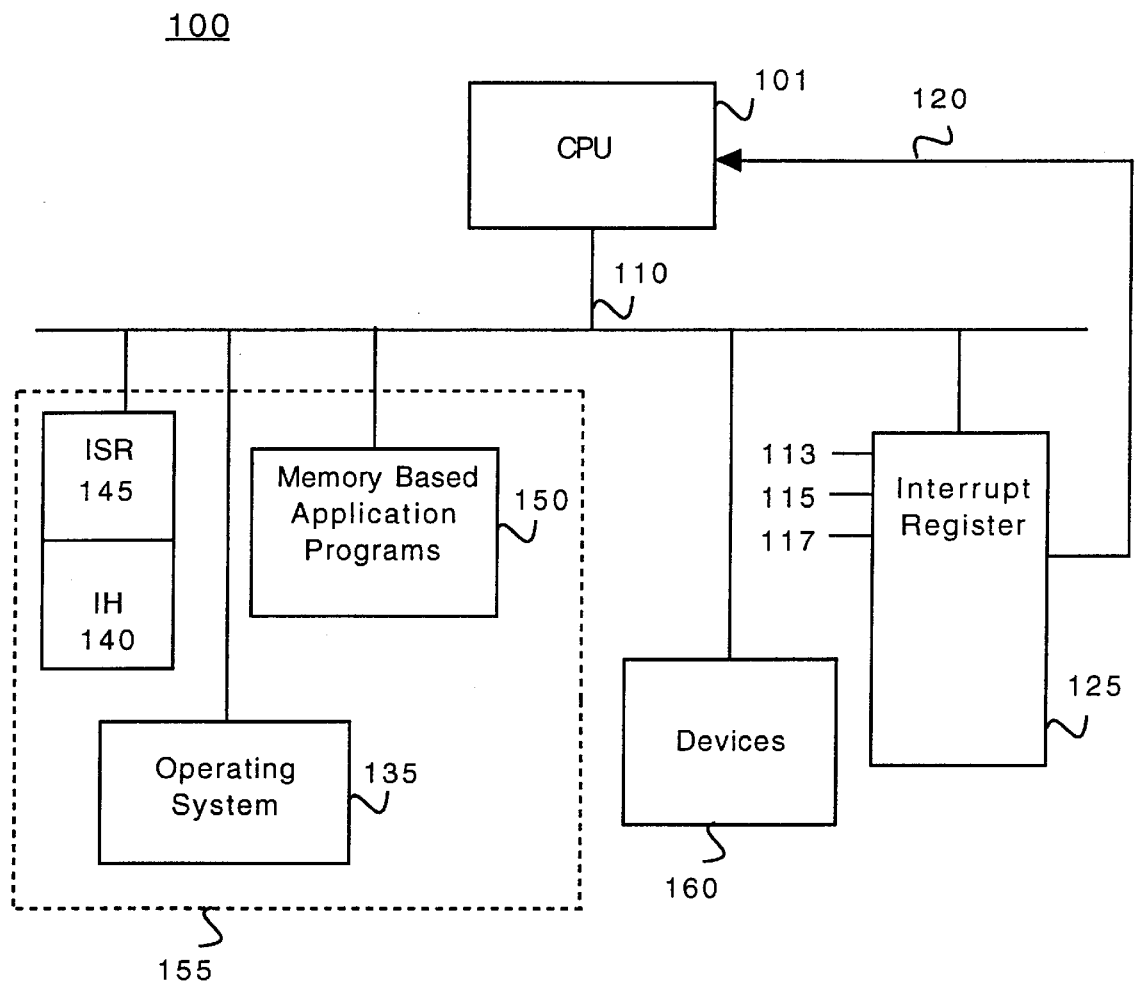
FIG. 1 is a block diagram illustrating an overview of the computer system of the present invention.

Referring now to FIG. 1, a block diagram is shown illustrating an overview representation of a computer system 100 used with the present invention. The function of interrupt register 125, as will be discussed in more detail below, is to receive and process interrupts generated by a variety of sources such as devices 160, without the need for complex addressing or loss of interrupting device status. Computer system 100 comprises a Central Processing Unit (CPU) 101, memory 155, operating system 135, application programs 150, interrupt handler (IH) 140, interrupt service routines (ISR) 145, devices 160, and an interrupt register 125, each coupled to a system bus 110. In the present invention, CPU 101 communicates with various computer system 100 elements 155, 160, and 125 using system bus 110 design techniques that are well known in the computer art. Address and data lines make up the system bus 110 and are used to facilitate this communication CPU 101 also communicates via an interrupt bus 120 with interrupt register 125. Devices 160 comprise user hardware such as printers, modems, and digital cameras as well as CPU specific hardware such as RTC's (Real Time Clocks) and Serial Communication Controllers. Communication also occurs between CPU 101 and the application programs 150. Application programs 150 can be software such as word-processors or graphics programs. The present invention may be used with individual or multiple simultaneously running application programs 150. In the case of multiple simultaneously running programs, the CPU 101 is considered to be running in a "multitasking environment." In a multitasking environment, if the application programs are each running individual software threads, the system may further be called "multithreaded."

An interrupt signal is typically received from one of devices 160 by one of interrupt signal lines (113, 115, and 117) of interrupt register 125. The interrupt register 125 processes the interrupt signal using control commands from ISR's 145 and IH 140, received across the system bus 110, and communicates an interrupt signal to the CPU 101 via the interrupt bus 120. The ISR's 145 are device specific software programs that integrate the operation of the application programs 150, devices 160, and CPU 101. The IH (Interrupt Handler) 140 is an additional software routine, that controls the order of scanning for the source of the interrupts. The order in which the ISR's 145 are executed is controlled by the operating system 135, according to priorities assigned by applications programs 150.

In the preferred embodiment, the CPU 101 is a PowerPC by Motorola Inc., Schaumburg Ill., the interrupt register 125 is part of an Application Specific Integrated Circuit (ASIC) and the operating system 135 is VxWorks.

Figure 2:
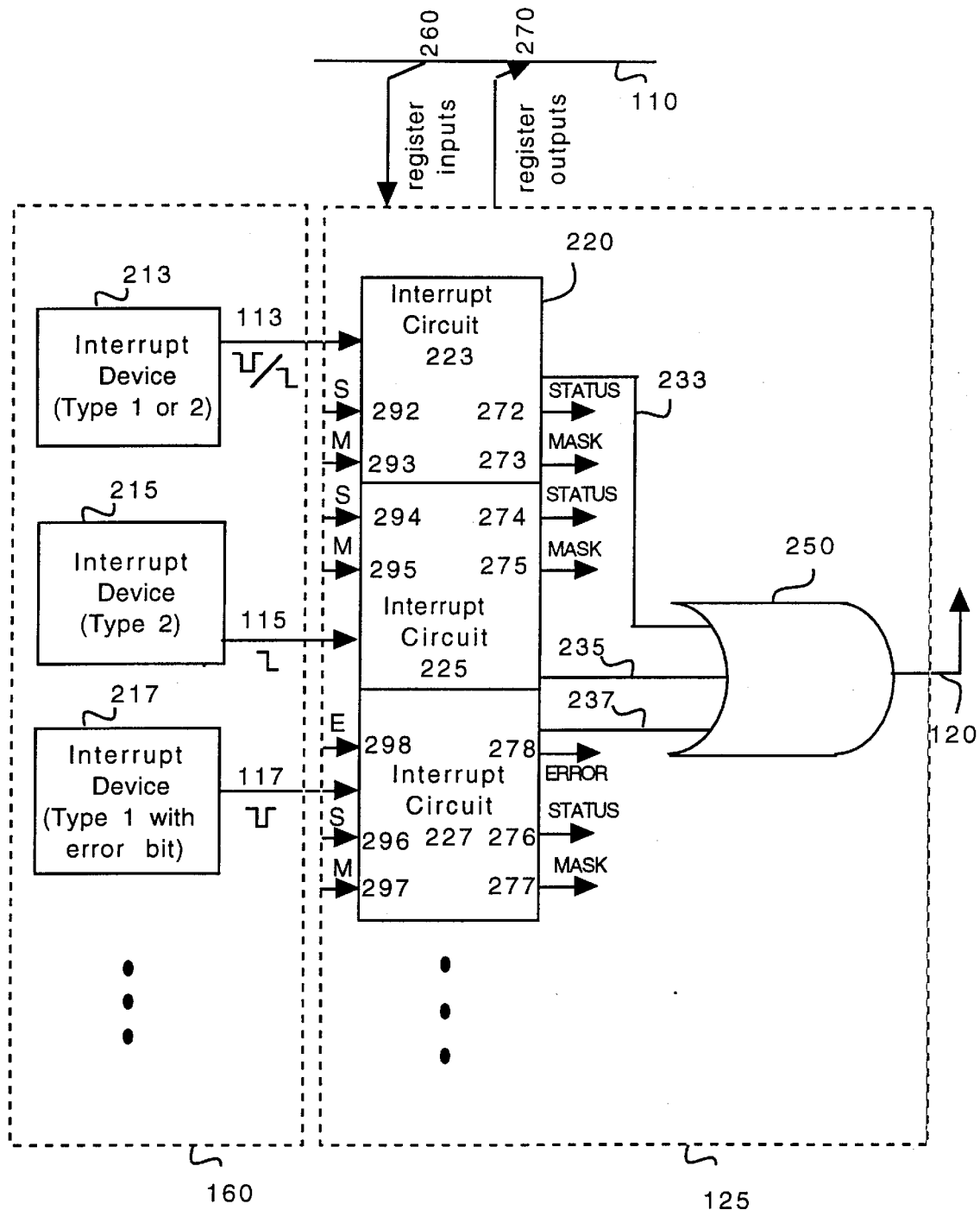
FIG. 2 is a block diagram of the interrupt circuitry of the present invention incorporated into a computer system.

Referring now to FIG. 2, a block diagram is shown illustrating the details of interrupt register 125 of the present invention.

Interrupting devices 213, 215, and 217 are shown having interrupt signal lines 113, 115, and 117 respectively. These interrupting devices (213, 215, and 217) are intended to be exemplary and generally originate from devices 160 of FIG. 1. Interrupting devices 213 and 217 can each be a Type 1 device, that is, the interrupt signal transmitted by this device doesn't need to be cleared. An example of a Type 1 device is a RTC (Real Time Clock). For Type 1 devices it is noted that the interrupt input pulse period should be of a duration that is long enough to be recognized by the interrupt register 125 but not so long that it is recognized as a second interrupt and thus serviced twice. Interrupting device 215 is a Type 2 device, that is, the interrupt signals transmitted by this device generate a constant interrupt level shift signal, until cleared by software. Thus, an interrupt signal from a Type 2 device requires the device to be serviced in order to clear the interrupt signal level. An SCC (Serial Communication Controller), IDE device (Integrated Device Electronics), and Ethernet are all examples of Type 2 devices. While in the preferred embodiment, Type 1 and Type 2 devices may use negative-logic to communicate interrupt signals over interrupt signal lines 113, 115, and 117, it is understood that devices using positive-logic could be used with the present invention, by inverting their outputs to the interrupt register 125. Interrupting device 217 additionally utilizes an Error (E) indicating bit 298. Such a device may be embodied in the form of a motor control circuit. Interrupting device 213 can also be a Type 2 device, that is, interrupt signals transmitted by this device can be a level rather than a pulse.

Each of the interrupt signal lines (113, 115, and 117) are interconnected to respective interrupt logic circuits (223, 225, and 227) of interrupt register 125. Interrupt signal outputs (233, 235, and 237) are connected to an OR circuit 250 which in turn is interconnected to an interrupt terminal of a CPU 101 using interrupt bus line 120. FIG. 2 shows three devices (213, 215, 217) respectively as a Type 1 or Type 2 device, a Type 2 device, and a Type 1 device utilizing an error bit, all interconnected to interrupt register 125. In the preferred embodiment there can be up to 5 such interrupt registers 125, and each interrupt register 125 can comprise more than one interrupt logic circuit (223, 225, 227) as part of interrupt circuit block 220. The type interrupt logic circuit used (223, 225, or 227) determines the type of interrupt signals (113, 115, 117) that it may receive from interrupting devices 160. The interrupt register 160 can receive interrupts from up to 16 separate Type 1 and Type 2 interrupting devices 160, as determined by the number of input lines from the devices, per 32 bit system bus. However, it is understood that there can be N interrupt registers 125, with the number and types of interrupting devices 160 interconnected to an interrupt register 125 limited only by the maximum register width of the system (i.e. limited by the maximum data size for the specific processor type). The interrupt register 125, may during any given time interval, receive and store the status of more than one of the interrupting devices 160. However, the interrupt register 125 should communicate only the logical OR of the stored interrupt requests since, typically, CPU 101 has only one interrupt input terminal assigned to process signals from the interrupt register 125 using interrupt bus 120. The interrupt register 125 of the present invention is designed for use in a multi-threaded computer system environment so that multiple simultaneous interrupt requests communicated from devices 160, to the individual interrupt logic circuits (223, 225, and 227), will be processed properly and without any loss of interrupt status information.

In the present invention, interrupt register 125 is used as a read-write register. Register inputs 260 and register outputs 270 are interconnected to the system bus 110 to communicate information between the operating system IH 140 and ISR 145 software routines and interrupt circuit block 220. The individual logic circuits (223, 225, and 227) of the interrupt circuit block 220 have associated M, S, and Error inputs (292–298) and MASK, STATUS, and ERROR output signals (272–278). Using the system bus 110, the MASK, STATUS, and ERROR output signals (272–278) can be read from while the M, S, and Error inputs (292–298) can be written to.

Only one computer system address is required to read and write to interrupt register 125. Consequently, each of individual logic interrupt circuits (223, 225, and 227) can also be treated as addressable registers and may be communicated with by bit specific read-write communication at the individual address of the interrupt register 125. This is beneficial because each of the interrupting devices 160, of which there may be many, may not require separate memory addresses. As a consequence, address decoding circuitry may be simplified.

The following tables establish the various combinations and effects of M and S inputs (292–297) and MASK and STATUS output signals (272–277) used with the three different types of interrupt circuits (223, 225, and 227).

TABLE 1

| M | S | WRITE Description |
|---|---|---|
| 0 | 0 | Unmask interrupts and clear STATUS bit * |
| 0 | 1 | (NO-OP)ERATION: this combination must have no effect |
| 1 | 0 | Set MASK and clear STATUS bit (polling) ** |
| 1 | 1 | Set MASK (no effect on STATUS); this removes an interrupt condition at the interrupt input terminal of the CPU without changing the S bit * |

*these combinations are used by the IH and ISR's
**this combination is used by software polling routines vs. interrupt routines The NO-OP instruction allows each interrupt circuit (223, 225, and 227) to function as an independent register by allowing ISR threads to read and write to an associated individual interrupt circuit without affecting the other interrupt circuits of interrupt register 125. This is implemented by setting the M and S input bits of the non-associated interrupt circuits for a NO-OP operation (MS=01). Any permutation of the aforementioned M and S input codes can be used to encode the various interrupt circuit conditions.

When reading the MASK and STATUS output signals (272–277), (Table 2 below), there is only one combination that indicates an interrupt condition (MASK=0, STATUS=1).

TABLE 2

| MASK | STATUS | READ Description |
|---|---|---|
| 0 | 0 | No interrupt, but MASK clear |
| 0 | 1 | Unmasked interrupt condition |
| 1 | 0 | No interrupt, but MASK set |
| 1 | 1 | No interrupt, but device condition exists (to be serviced by polling routine) |

Figure 3:
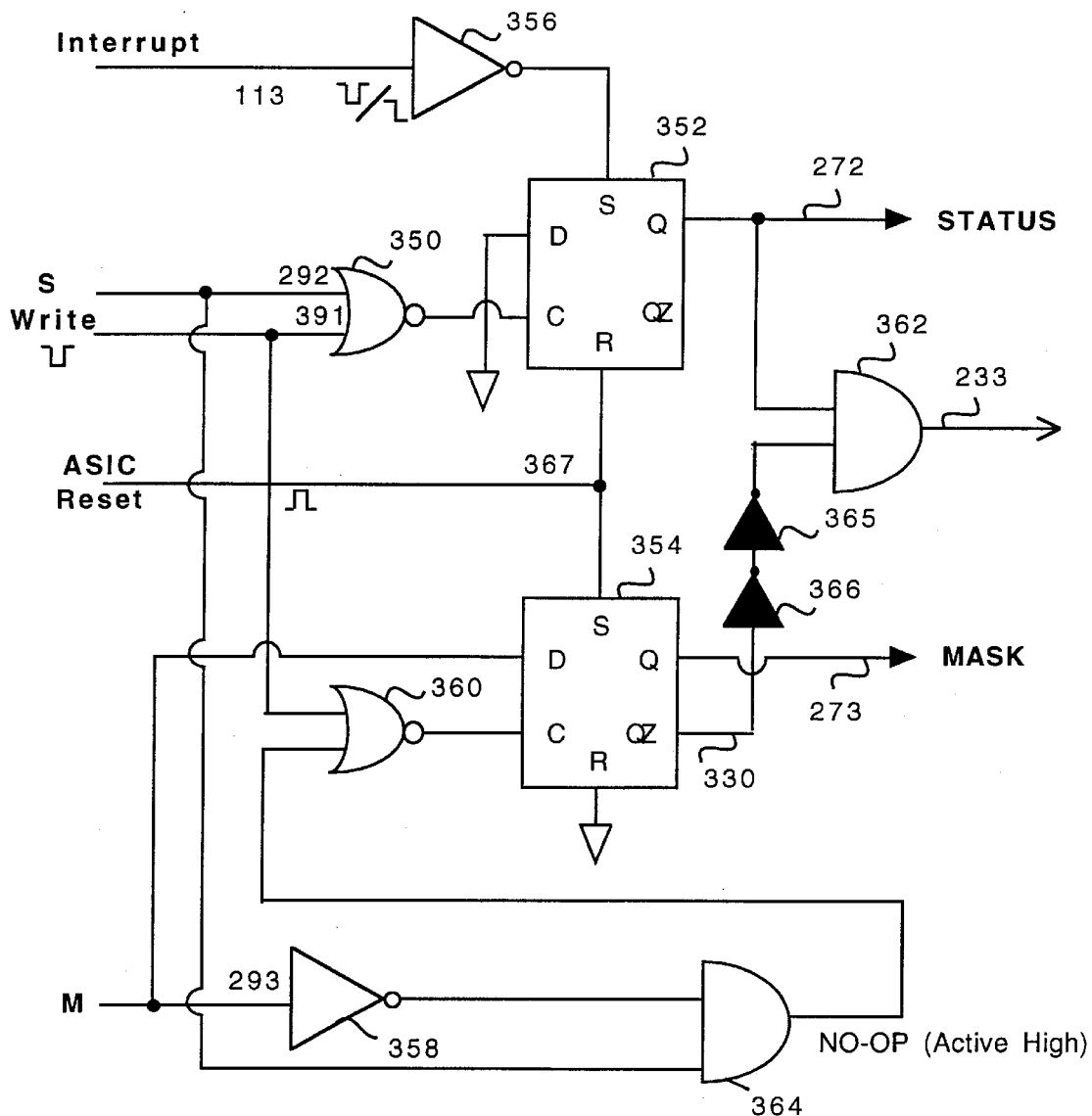
FIG. 3 is a schematic diagram of the present invention, for handling Type 1 or Type 2 interrupting devices.

Referring now to FIG. 3, with further reference to FIG. 2 and Tables 1 and 2, a schematic diagram is shown of interrupt logic circuit 223 as used with Type 1 or Type 2 interrupting devices.

Logic circuit 223 functions to receive interrupt signal 113 and store the interrupt signal until it can be processed by CPU 101. Control over the interrupt logic circuit 223, as illustrated in Table 1 and Table 2, is effectuated via the S and M inputs 292 and 293. The function of S and M inputs 292 and 293 is to act in combination with interrupt circuit 223 to unmask, mask, or clear the input interrupt signal 113. WRITE input signal 391 functions in combination with S and M inputs 292 and 293 to clock the interrupt logic circuit 223 to effect changes at interrupt output 233, MASK output 273 and STATUS output 272.

Initially, an interrupting device 213 communicates an interrupt condition as interrupt signal 113 to inverter 356. The occurrence of the interrupt condition is independent from the clocking of the M and S inputs 293 and 292 and may occur at any time. Inverter 356 output terminal is connected to the set terminal of STATUS flip-flop 352 (not to be confused with the S-input 292). The STATUS flip-flop 352 functions as part of interrupt circuit 223 and, depending on the condition of S and WRITE inputs 292, 391, and interrupt signal 113, indicates a STATUS output 272 high or low signal. The NOR gate 350 logically combines S and WRITE inputs 292 and 391 and has its output connected to the clock input terminal C of STATUS flip-flop 352. The STATUS flip-flop 352 is clocked only if the S-input 292 is 0 (S=0), and is cleared by the falling edge of a WRITE input signal 391 from the system bus 110 if (S=0), unless the interrupting device 213 is holding the interrupt input line 113 active. In this case, the write cycle fails, and the STATUS output signal 272 remains set. The D-input terminal of STATUS flip-flop 352 is connected to ground. The reset terminal R of STATUS flip-flop 352 is connected to both the S terminal of MASK flip-flop 354 and the reset input line 367 of the ASIC (application specific integrated circuit, not shown). The output terminal Q of STATUS flip-flop 352 is connected to an input terminal of AND gate 362. Inverted output terminal QZ of STATUS flip-flop 352 is left unconnected and open.

The M-input 293 is received by the interrupt logic circuit 223 from system bus 110 and is coupled to the input of inverter 358 and to the D input terminal of MASK flip-flop 354. The S and WRITE inputs 292 and 391, in combination with M-input 293, are used to establish the various input conditions necessary for corresponding high or low indications at the MASK and QZ outputs 273 and 330 of MASK flip-flop 354. The M-input 293 is inverted by inverter 358 and is logically combined with S input 292 by AND gate 364 to produce an active high NO-OP signal when MS=01. The output of AND gate 364 is logically combined with the WRITE input signal 391 by NOR gate 360. The output of NOR gate 360 provides a clock signal to MASK flip-flop 354. Assertion of the NO-OP signal prevents WRITE input signal 391 from appearing at the output of NOR-gate 360, thus preventing any MASK flip-flop 354 changes. Since the S-input 292 value is 1 (MS=01), the NO-OP decoding has no effect on the STATUS output signal 272. As with the STATUS flip-flop 352 reset terminal R, the set input terminal of MASK flip-flop 354 is tied to the ASIC reset input line 367. The ASIC reset input line 367 is used to preset the state of the MASK and STATUS output signals 272 and 273 to MASK=1, STATUS=0 at system power up (MASK-STATUS=10). The reset terminal R of MASK flip-flop 354 is connected to ground. Both outputs Q of flip-flops 352 and 354 respectively, are read-only output indications of the STATUS and the MASK output signals 272 and 273. Output QZ 330 of MASK flip-flip 354 is connected to an input terminal of AND gate 362 through inverters 365 and 366. The QZ 330 and STATUS 272 output signals are logically combined by AND gate 362 to signal a high or low interrupt 233 condition at the output of AND gate 362, as indirectly determined by the combination of: M and S inputs 293, 292, WRITE input 391, and interrupt input 113. A delay is generated between QZ output signal 330 and the STATUS output signal 272, by inverters 365 and 366, to prevent glitches when changing STATUS and MASK output signals 272 and 273 at the same time.

An input combination of M and S inputs (MS=00) results in an interrupt circuit 223 output condition that unmasks interrupts if they exist (MASK-STATUS=01), and output condition (MASK-STATUS=00) if they do not exist. Output condition (MASK-STATUS=01) is the only condition that passes an interrupt input 113 to interrupt output 233. With an M-input 293 and S-input 292 combination (MS=00), a WRITE input signal 391 clocks STATUS flip-flop 352 to clear the STATUS output (MASK-STATUS=00) if no interrupt signal 113 is indicated, and to set (MASK-STATUS=01) otherwise. An input combination of M and S inputs (MS=00) and WRITE signal 391 clocks the MASK flip-flop 354, setting MASK output 273 low. An input combination of M and S inputs (MS=10) and WRITE signal 391 sets MASK output high 273 and clears STATUS output 272 (MASK-STATUS=10) and clears interrupt output 233 in preparation for a new interrupt signal 113. An input combination of M and S inputs (MS=11) and WRITE signal removes an interrupt condition at interrupt output 233, sets the MASK output 273 high, and has no effect on the STATUS output 272 (MASK-STATUS=11). The various combinations of M and S inputs 293, 292 and corresponding MASK and STATUS outputs 273, 272 just described will now be explained in the context of a sequential response of interrupt logic circuit 223 to an interrupting device 213.

Figure 4:
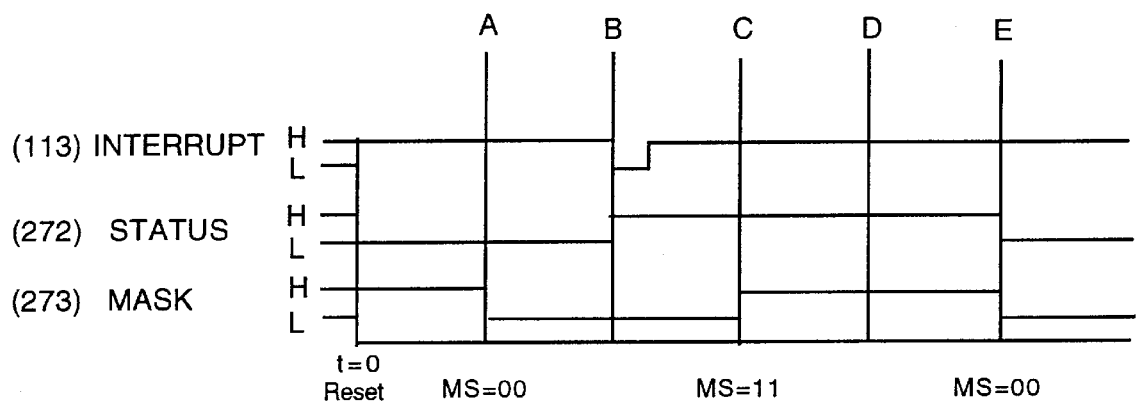
FIG. 4 is a timing diagram corresponding to the schematic of FIG. 3, in response to a Type 1 device.

Referring now to FIG. 4, a timing diagram of the present invention is illustrated with reference to the sequential response of the interrupt logic circuit 223, shown in FIG. 3, to a Type 1 (pulse-type) interrupting device 213. At t=0 (the left edge of the FIG. 4), a system reset signal on ASIC reset input line 367 initializes the logic circuit 223 by setting MASK output signal 273 high (H) (MASK-STATUS=10). At illustrated point A of FIG. 4, by writing MS=00, an Interrupt Service Initialization Routine clears the MASK output signal 273 (MASK-STATUS=00), setting the Mask signal 273 low (L). Note, that all other interrupting circuits (225 and 227) are written to at the same time. The NO-OP code (MS=01) is used for these other interrupt circuits so as to not disturb or disrupt their operation. This is true for all the IH and ISR writes to the interrupt circuits as well. At point B of FIG. 4 an interrupt is signaled by a Type 1 device 213 on interrupt signal line 113, setting the STATUS output signal 272 high (H) (MASK-STATUS=01). At point C, an Interrupt Handler 140 (IH) clears the interrupt output 233 to OR circuit 250 and consequently to the CPU 101 by writing MS=11, which sets the MASK output signal 273 high (H) (MASK-STATUS=11). Here the IH 140 signals (via the operating system) the ISR in software, and the operating system 135 runs the highest priority thread when the IH 140 finishes. Most likely this will be the needed ISR, unless a higher priority ISR is running already. At point D, the ISR 145 processes the interrupt event signaled by the IH 140. It should be noted that since the interrupt on signal line 113 is a Type 1 signal, the interrupt from the interrupting device 213 does not need resetting. At point E the ISR 145 re-enables interrupts by writing MS=00, which clears the MASK and STATUS output lines 273 and 272 (MASK-STATUS=00).

Figure 5:
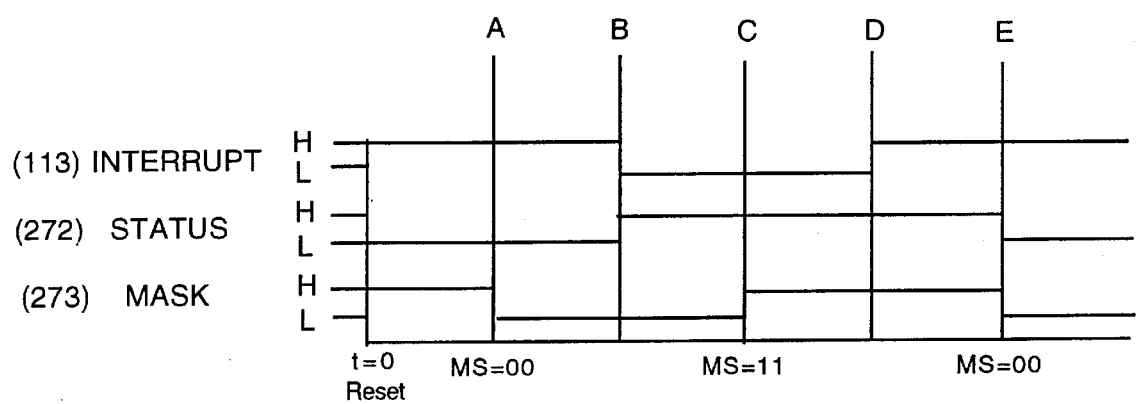
FIG. 5 is a timing diagram corresponding to the schematic of FIG. 3, in response to a Type 2 device.

Referring now to FIG. 5, a timing diagram of the present invention is illustrated with reference to the sequential response of the interrupt circuit 223, shown in FIG. 3, to a Type 2 level change interrupting device.

At t=0 (the left edge of the FIG. 5), a system reset signal on ASIC reset input line 367 sets STATUS output signal 272 low (L) and MASK output signal 273 high (H) (MASK-STATUS=10). At illustrated point A of FIG. 5, an Interrupt Service Initialization Routine writes MS=00, which clears the MASK output signal 273 (MASK-STATUS=00). Note, that all other interrupting circuits (225, 227) are written to at the same time. The NO-OP code (MS=01) is used for these other interrupt circuits so as to not disturb or disrupt their operation. This is true for all the IH and ISR writes to the interrupt circuits as well. At point B of FIG. 5, an active-low interrupt is signaled by a Type 2 device 213 on interrupt line 113, setting STATUS output line 272 high (H) (MASK-STATUS=01). At point C, an Interrupt Handler 140 (IH) writes MS=11, which clears the interrupt output 233 to OR circuit 250 and consequently to the CPU 101, by setting the MASK output signal high (H) (MASK-STATUS=11). Here the IH signals (via the operating system 135) the ISR in software, and the operating system runs the highest priority thread when the IH finishes. Most likely this will be the needed ISR, unless a higher priority ISR is running already. At point D, the ISR 145 processes the interrupt event signaled by the IH 140, and clears the interrupting device status by writing to its control registers. At point E the ISR 145 re-enables interrupts by writing MS=00, which clears the MASK and STATUS output lines 273 and 272 (MASK-STATUS=00).

Figure 6:
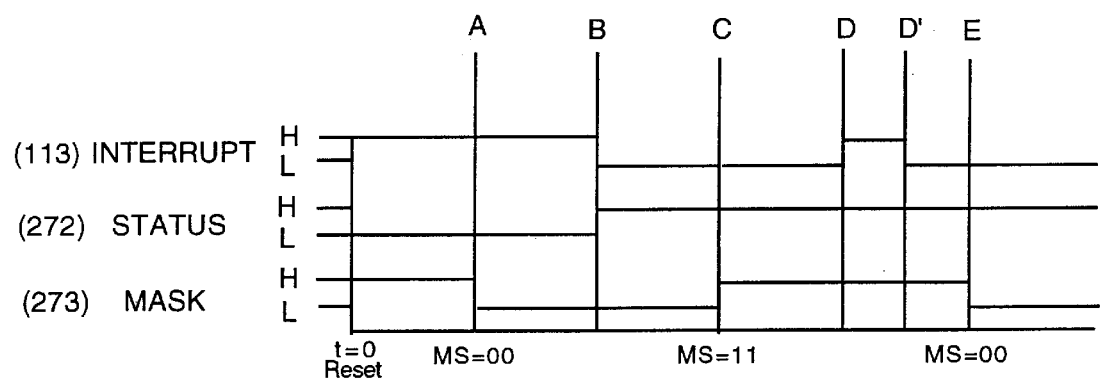
FIG. 6 is a timing diagram corresponding to the schematic of FIG. 3, in response to an early interrupt from a Type 2 device.

Referring now to FIG. 6, a timing diagram of the present invention is illustrated with reference to the sequential response of the interrupt circuit 223, shown in FIG. 3, to a Type 2 device where an interrupt on signal line 113 occurs during a time interval in which the MASK output signal 273 has previously been set high (H). The timing sequence of FIG. 6 is identical to that shown in FIG. 5, up to illustrated point D'. At illustrated point D', an interrupt is signaled on interrupt signal line 113 by a Type 2 device 213. At some later time (point E) when the MASK output 273 is cleared, the combination of STATUS and MASK output signals 272 and 273 indicates an unmasked interrupt condition at interrupt output 233 (MASK-STATUS=10). In this manner, a new interrupt event at point D' will not be lost or mishandled, even though the MASK and STATUS condition indicates MASK-STATUS=11 condition from a previous interrupt request (point C).

Figure 7:
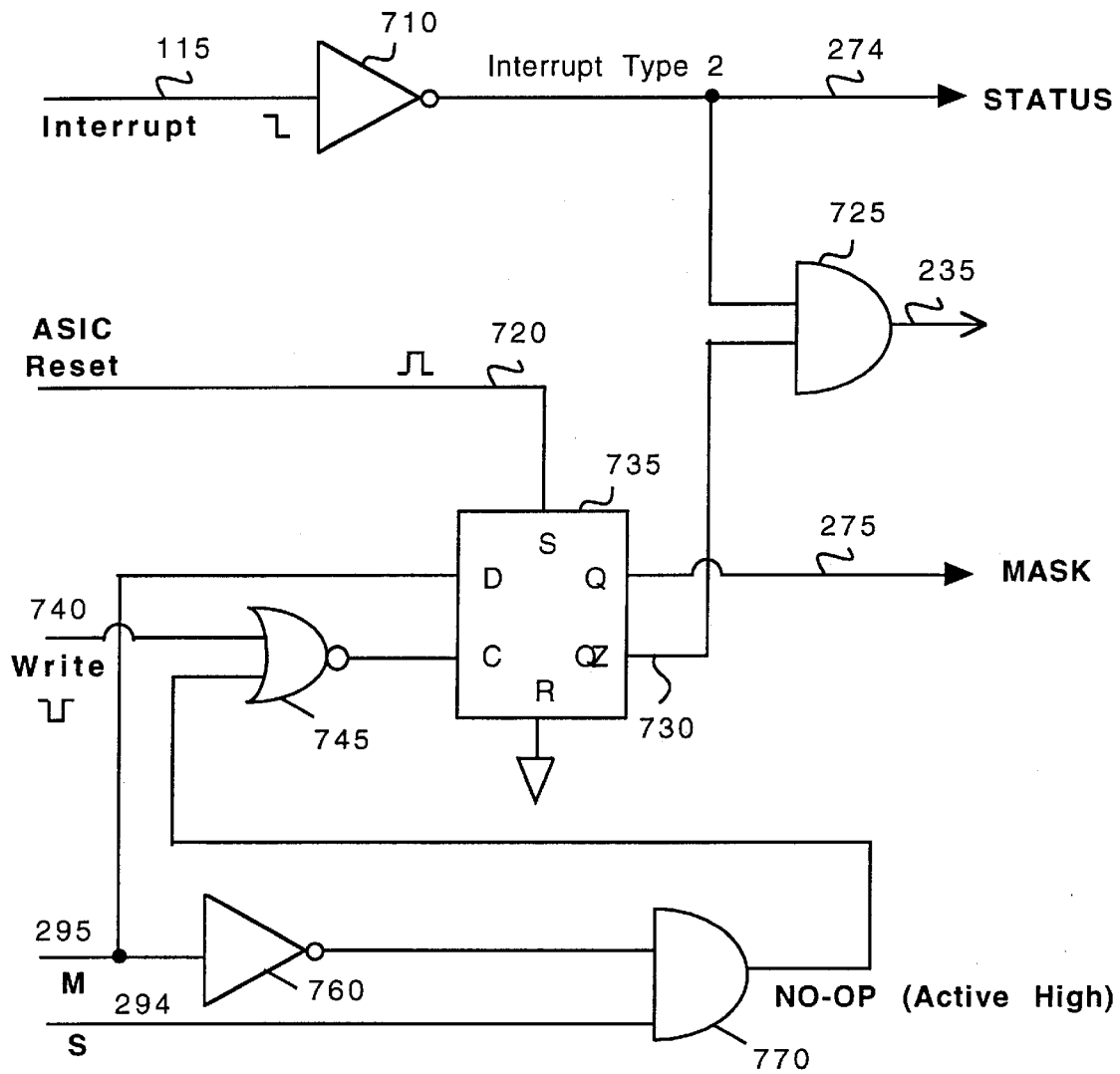
FIG. 7 is a schematic diagram of the present invention, for handling only Type 2 interrupting devices.

Referring now to FIG. 7, with further reference to FIG. 2 and Tables 1 and 2, a schematic diagram of simplified interrupt logic circuit 225 is illustrated with reference to use with a Type 2 device 215. Simplified interrupt logic circuit 225 can only be used with Type 2 devices. In contrast, interrupt logic circuit 223, illustrated in FIG. 3, can be used with either Type 1 or Type 2 devices. The function of interrupt logic circuit 225 is to indicate occurrences of interrupt signal 115 to CPU 101. Control of the interrupt logic circuit 225 as illustrated in Table 1 and Table 2 is effectuated via the M and S inputs 295 and 294. The function of M and S inputs 295 and 294 is to act in combination with interrupt circuit 225 to unmask or mask interrupt signal 115. WRITE input signal 740 functions in combination with M and S inputs 295 and 294 to clock the interrupt MASK flip flop 735 to effect changes at interrupt and MASK outputs 235 and 275.

Initially, an interrupting device 215 communicates an interrupt condition as an interrupt signal 115 to inverter 710. The occurrence of the interrupt condition is independent from the clocking of the M and S inputs 295 and 294 and may occur at any time. Inverter 710 output terminal is connected to an input of AND gate 725.

M-input 295 is received by the interrupt logic circuit 225 from the system bus 110, and is coupled to the input of inverter 760 and to input terminal D of MASK flip-flop 735. The S and WRITE inputs 294 and 740, in combination with M-input 295, are used to establish the various input conditions necessary for corresponding high and low indications at the MASK and QZ outputs 275 and 730 of MASK flip-flop 735. The M-input 295 is inverted by inverter 760 and is logically combined with S input 294 by AND gate 770 to produce an active high NO-OP signal when MS=01. The output of AND gate 770 is logically combined with the WRITE input signal 740 by NOR gate 745. The output of NOR gate 745 provides a clock signal to the MASK flip-flop 735. Assertion of the NO-OP signal prevents WRITE input signal 740 from appearing at the output of NOR-gate 745, thus preventing any MASK flip-flop 735 changes. Since STATUS output 274 functions to directly indicate the inverted status of interrupt signal 115, an S-input 292 value of 1, used for NO-OP decoding, has no effect on the STATUS output. The set input terminal of MASK flip flop 735 is tied to ASIC reset input line 720. The ASIC reset input 720 is used to preset the MASK output signal 275 to MASK=1 (MASK-STATUS=10) at system power up. The reset terminal R of MASK flip-flop 735 is connected to ground. The Q output terminal of MASK flip-flop 735 is a read-only indication of MASK output 275. Output QZ 730 of MASK flip-flip 735 is connected to an input terminal of AND gate 725. The QZ 730 and STATUS 274 output signals are logically combined by AND gate 725 to signal a high or low interrupt 235 condition at the output of AND gate 725, as indirectly determined by the combination of: M and S inputs 295, 294, WRITE input 740, and interrupt input 115.

An input combination of M and S inputs 295, 294 (MS=00) and WRITE input 740 results in an interrupt circuit 225 output condition (MASK-STATUS=01) that unmasks interrupts if they exist and an output condition (MASK-STATUS=00) if they do not. An output condition (MASK-STATUS=01) is the only condition that passes an interrupt input 115 to interrupt output 235. An input combination of M and S inputs (MS=00) and WRITE input 740 clocks the MASK flip-flop 735, setting MASK output 275 low. An input combination of a non-active interrupt signal 115 (high), M and S inputs (MS=10), and WRITE input 740 sets MASK output 275 high and STATUS output 274 low (MASK-STATUS=10) and removes an interrupt condition or interrupt output 235 in preparation for a new interrupt signal. An input combination of an active interrupt signal 115 and M and S inputs (MS=11) and WRITE input 740 sets the MASK and STATUS outputs high (MASK-STATUS= 11). This removes an active interrupt condition at interrupt output 235. The various combinations of M and S inputs 295, 294 and corresponding MASK and STATUS outputs 275, 274 just described will now be explained in the context of a sequential response of interrupt logic circuit 225 to an interrupting device 215.

Figure 8:
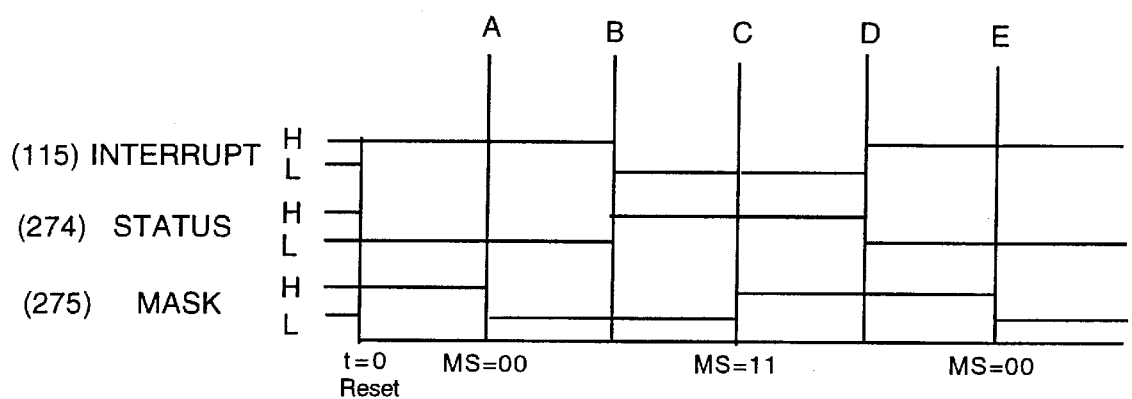
FIG. 8 is a timing diagram corresponding to the schematic of FIG. 7 in response to a Type 2 device.

Referring now to FIG. 8, a timing diagram of the present invention is illustrated with reference to the sequential response of interrupt logic circuit 225, shown in FIG. 7 to a Type 2 interrupting device 215. The operation of interrupt logic circuit 225 at point D of FIG. 8 differs from that of interrupt logic circuit 223 in FIG. 4 as a result of the STATUS output signal 274 being directly responsive to the Interrupt input signal line 115. At t=0 (the left edge of FIG. 8) a system reset signal on ASIC reset line 720 initializes the logic circuit 225 MASK output signal 275 high (H) (MASK-STATUS=10). At illustrated point A an Interrupt Initialization Routine writes a MS=00, which clears the MASK output signal 275 (MASK-STATUS=00). Note, that all other interrupting circuits (223, 227) are written to at the same time. The NO-OP code (MS=01) is used for these other interrupt circuits so as to not disturb or disrupt their operation. This is true for all the IH and ISR writes to the interrupt circuits as well. At point B of FIG. 8, an active-low interrupt is signaled by a Type 2 device 215 on interrupt signal line 115, setting the STATUS output signal 274 high (H) (MASK-STATUS=01). At point C, an Interrupt Handler 140 (IH) writes a MS=11, which clears interrupt output 235 by setting the MASK output signal 275 high (H) (MASK-STATUS=11). Here the IH 140 signals the ISR 145 (via the operating system) in software, and the operating system 135 runs the highest priority thread when the IH finishes. Most likely this will be the needed ISR, unless a higher priority ISR is running already. At point D, the ISR 145 processes the signal and services the interrupting hardware device 215, consequently, setting the STATUS output signal 274 low (L) (MASK-STATUS=10). At point E the ISR 145 re-enables interrupts by writing MS=00, which clears the MASK and STATUS output lines 275 and 274 (MASK-STATUS=00).

Figure 9:
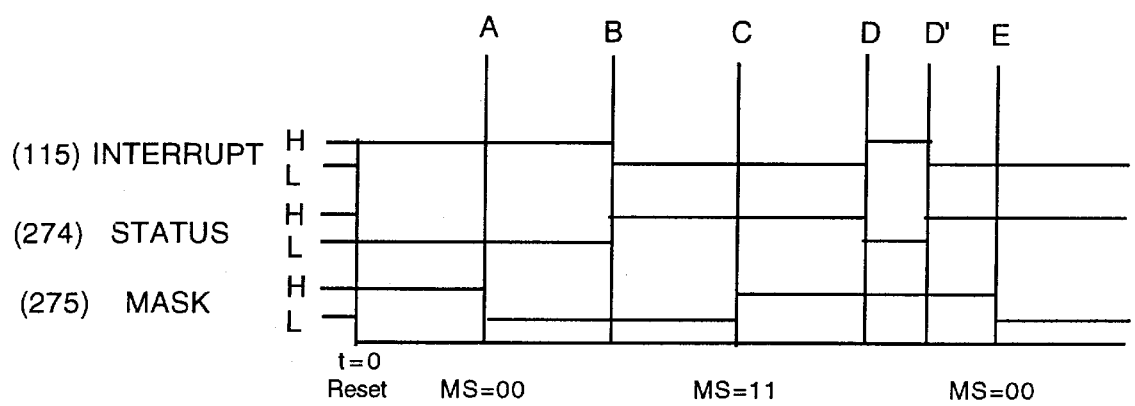
FIG. 9 is a timing diagram corresponding to the schematic of FIG. 7, in response to an early interrupt from a Type 2 device.

Referring now to FIG. 9, a timing diagram of the present invention is illustrated with reference to the sequential response of interrupt logic circuit 225 to a Type 2 interrupting device 215, in a situation where the interrupt signal line 115 is asserted during a time interval in which the MASK output signal 275 has previously been set high (H). This is illustrated at point D' of the timing sequence of FIG. 9. This timing sequence is identical to that shown in FIG. 8, up to illustrated point D'. At point D' an interrupt is signaled by a Type 2 device 215 on interrupt signal line 115, setting the STATUS output signal high (H) (MASK-STATUS=11). At some later time (point E) when the MASK output signal 275 is cleared by the ISR, the combination of STATUS and MASK outputs 274 and 275 indicates an unmasked interrupt condition (MASK-STATUS=01) at interrupt output 235. In this manner, a new interrupt event at point D' will not be lost or mishandled, even though the MASK and STATUS condition indicates (MASK-STATUS=11) from a previous interrupt request (point C).

Figure 10:
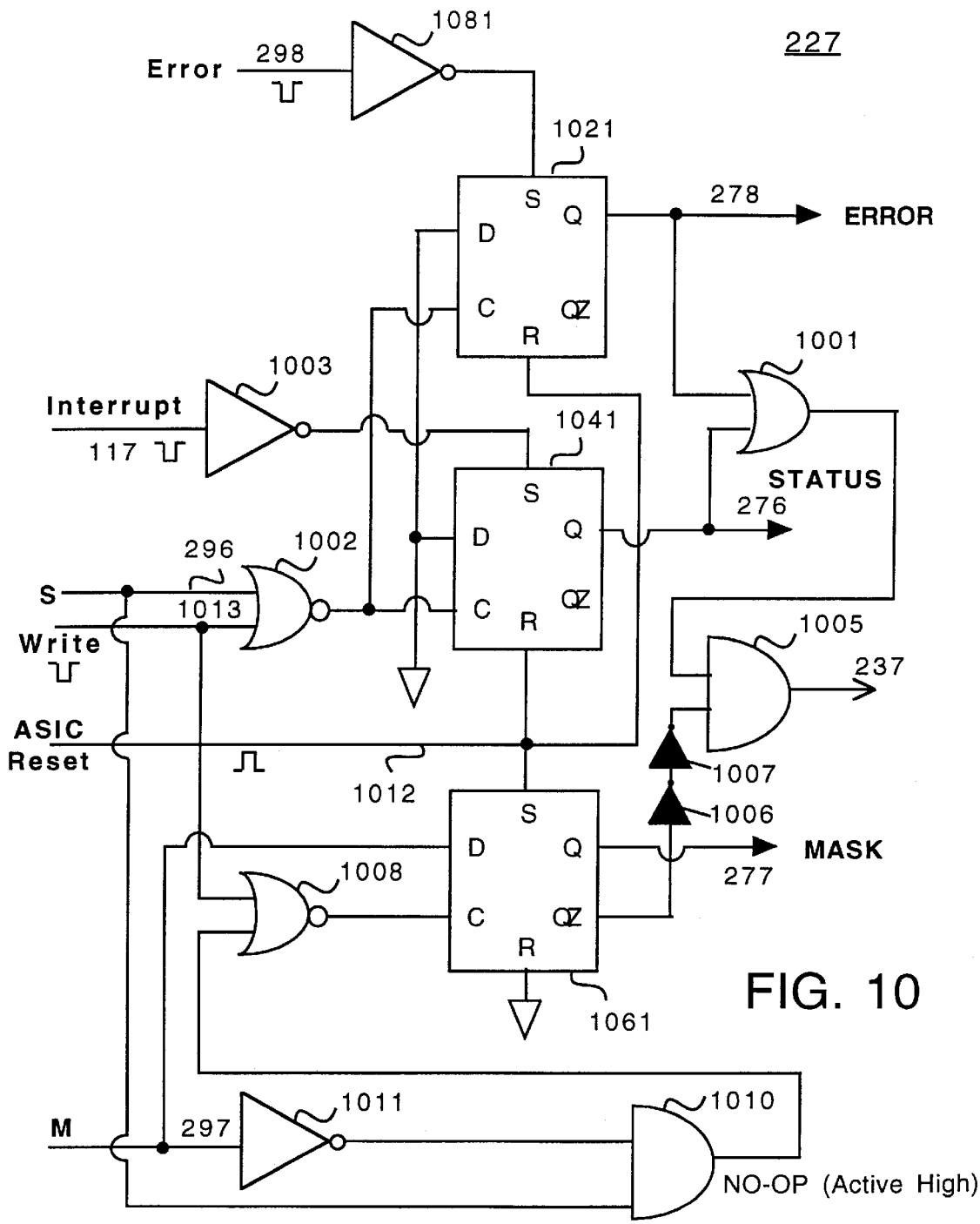
FIG. 10 is a schematic diagram of the present invention, for handling Type 1 devices that have an error indicating output.

Referring now to FIG. 10, a schematic diagram illustrates interrupt logic circuit 227 used with a Type 1 device 217. Such a device may be a motor controller circuit. Interrupt logic circuit 227 implements the additional Error input 298 and ERROR output 278 by addition of ERROR flip-flop 1021 to the interrupt logic circuit 223 illustrated in FIG. 3. The Error input signal 298 generated by device 217 can be used to signal the status of additional device specific information to CPU 101. The CPU 101 can use the ERROR output 278 in conjunction with interrupt output 237 to determine in what manner to process the interrupt request. Error input 298 is coupled to the set terminal of ERROR flip-flop 1021 through inverter 1081. A logical combination of S and WRITE inputs 296 and 1013 to NOR gate 1002 generates a signal at the NOR gate 1002 output to clock the ERROR flip-flop 1021. The NOR gate 1002 and inverter 1081 outputs establish the input conditions necessary for generation of the ERROR output 278 signal by ERROR flip-flop 1021. Interrupt logic circuit 227 utilizes the relationships of M and S inputs and MASK and STATUS outputs as shown in Tables 1 and 2, but requires the following additional considerations:

a) ERROR output 278 is readable using the system bus, however since Error input 298 is not connected to the system bus the Error input is not writable.

b) Writing a "0" to the S-input 296 will clear both the STATUS and ERROR output signals 276 and 278 c) The STATUS output 276 and ERROR output 278 are logically combined by OR circuit 1001. The OR circuit 1001 output is logically combined with the QZ output from MASK flip-flop 1061 by AND gate 1005 to generate interrupt output signal 237.

d) MASK-STATUS-ERROR=001, 010 or 011 output combination codes indicate an interrupt output 237 condition.

e) Any permutation of the M and S input codes can be used to encode the various interrupt circuit conditions.

While the aforementioned interrupt circuits 220, 225, and 227 have been described with reference to specific embodiments implemented with specific hardware elements, those skilled in the art will recognize that other combinatorial logic could be used to perform the functions of the present invention.

The following discussion illustrates two methods of operation of the present invention. These methods comprise: setting all MASK outputs (MASK-STATUS=10) of all interrupt circuits of interrupt register 125 to prevent interrupts (in hardware via power up reset inside the ASIC ). After reset, Interrupt Initialization Routine software sets up the computer system for level sensitive, low active interrupts. Device drivers are associated with specific interrupts. Ownership can be predetermined using hardcoded connections, such as when an IH 140 sends signals to specific ISRs that have been hardcoded to specific interrupts. Another method of ownership can be implemented at run time, during initialization, when all the drivers are connected to the IH 140 dynamically. This is done by each ISR during initialization, to register its use of specific interrupts with the IH 140. The latter method allows for software flexibility, resulting from the fact that each ISR 145 is independent of the IH 140. The device drivers are responsible for enabling (unmasking) interrupts by writing a (MS=00) to the appropriate MS input bits, as well as writing a (NO-OP)eration (MS=01) to all other MS pairs in the same interrupt register. At this point, any pending interrupts, or any new interrupts will cause the computer to initiate an external sequence. Below is the sequence of actions related to servicing external devices 160:

a) A device condition occurs which triggers an interrupt condition in an corresponding interrupt circuit.

b) The STATUS output bit in the corresponding interrupt circuit of interrupt register 125 is set.

c) Assuming the MASK output bit is clear (MASK-STATUS=01), the interrupt circuit signals the CPU 101 that an interrupt has occurred.

d) The processor 101 determines the source of the interrupt, and passes control to the system IH 140.

e) The system IH 140 determines which interrupt is active, and reads the appropriate interrupt register 125 MASK and STATUS output bits.

f) The system IH 140 looks for the proper value of MASK and STATUS output bits which indicates an interrupt condition (MASK-STATUS=01). The IH 140 looks once at each MASK and STATUS output pair in priority order. For each and every match found the following steps are taken:

i) The system IH 140 masks the interrupt by writing (MS=11) to the interrupting device MS input pair. This write operation must also write (NO-OP)eration (MS=01) to all other MS input pairs in the same interrupt register. This operation will remove this interrupt signal source from the CPU 101 interrupt terminal without losing the status of any other interrupt circuits within interrupt register 125.

ii) The IH 140 sends a signal to the appropriate ISR 145 via the operating system 135.

g) The IH 140 returns from the interrupt.

h) The receiving ISR 145 runs at the appropriate time, as controlled by assigned priority, and receives one signal for each MASK and STATUS output pair whose interrupts the ISR is responsible for. Thus, the ISR should never process more than one MASK and STATUS output pair from an interrupt signal.

i) For Type II devices, the ISR 145 process the interrupt condition by reading and/or writing to the interrupting device. For Type 1 devices, the ISR takes appropriate action such as starting a specific routine.

j) Once the interrupt processing is complete, the ISR 145 writes (MS=00) to the appropriate interrupt circuit MS input pair, and also writes a (NO-OP)eration (MS=01) to all other MS input pairs in the same interrupt register. The (NO-OP)eration prevents conflict with the IH 140, other ISR's 145 and other interrupting devices 160.

While the present invention has been described in terms of a preferred embodiment in a specific system environment, those skilled in the art recognize that the invention can be practiced, with modification, with different hardware and software environments within the spirit and scope of the claims.

What is claimed is:

1. A circuit for facilitating communications between peripherals and a control device, comprising:
    a first set of input circuits, at least one of the first set of input circuits being responsive to peripheral signals from a respective peripheral, including a signal pulse and a signal level change from a first level to a second level;
    a set of status circuits coupled to the first set of input circuits, responsive to the peripheral signals being received at the first set of input circuits to generate a set of status signals;
    a set of output circuits coupled to the set of status circuits, for indicating the set of status signals to the control device; and
    an ASIC reset input line coupled to the set of status circuits, for presetting values in the status circuits.

2. The circuit as recited in claim 1, wherein at least a second of the first set of input circuits is responsive to a signal pulse.

3. A circuit as recited in claim 1, wherein the signal pulse is received at the first set of input circuits independent of the status signals; and
    the signal level change from a first level to a second level is received at the first set of input circuits dependent on the status signals.

4. The circuit as recited in claim 3, wherein the first set of output circuits are coupled to inputs of an OR-circuit.

5. The circuit as recited in claim 1, further comprising a second set of input circuits coupled to the set of status circuits, each said input circuit of said second set being responsive to control signals received from the control device.

6. The circuit as recited in claim 5, wherein the second set of input circuits is coupled to receive a set of bits in parallel from the control device.

7. The circuit as recited in claim 6, wherein the number of input circuits within the first set of input circuits is less than one plus one half the number of bits within the set of bits.

8. The circuit as recited in claim 6, wherein at least one output circuit indicates a status signal representative of the occurrence of a first peripheral signal; and
    in response to the status signal being indicated at the set of output circuits, the status signal representative of the occurrence of the first peripheral signal is selectively cleared.

9. The circuit as recited in claim 8, wherein at least another output circuit indicates a status signal representative of the occurrence of a second peripheral signal; and
    in response to the occurrence of the first peripheral signal the status signal indicated at the set of output circuits is selectively controlled to indicate the status signal representative of the occurrence of the second peripheral signal.

10. The circuit as recited in claim 9, wherein the status circuit is selectively cleared and controlled using the set of bits in parallel.

11. The circuit as recited in claim 10, wherein the circuit is part of an ASIC.

12. The circuit as recited in claim 9, further comprising a third set of input circuits coupled to the set of status circuits, each responsive to a signal being received from the peripherals.

13. The circuit as recited in claim 12, wherein the signal received from the peripheral is an error indication.

14. A method for using a circuit to facilitate communications between peripherals and a control device using a circuit, comprising the steps of:
    presetting the outputs of the circuit from an ASIC;
    receiving a first set of peripheral signals from the peripherals at first inputs of the circuit responsive to both a signal pulse and a signal level change from a first level to a second level;
    indicating an occurrence of the first set of peripheral signals at outputs of the circuit;
    reading the indications at the outputs of the circuit as a set of values indicative of a first circuit condition;
    receiving a second set of peripheral signals from the peripherals at the inputs of the circuit;
    indicating an occurrence of the second set of peripheral signals at outputs of the circuit; and
    writing a set of values to second inputs of the circuit so that the outputs of the circuit indicate the occurrence of the second set of peripheral signals.

15. The method as recited in claim 14, wherein the step of writing the set of values selectively clears the indication of the occurrence of the first set of peripheral signals from the output of the circuit.

16. The method as recited in claim 15, wherein the step of writing a set of input values comprises writing the set of values as a set of bits in parallel from the control device.

17. A circuit for facilitating communications between a peripheral and a control device, comprising:
    first input means responsive to a peripheral signal from the peripheral including a signal pulse and a signal level change from a first level to a second level;
    status means coupled to the first input means responsive to an occurrence of the peripheral signal received at the first input means to generate a status signal;
    an ASIC reset input line coupled to the status means, for presetting values in the status means;
    second input means coupled to the status means for receiving control signals from the control device; and
    output means coupled to the status means for indicating the status signal to the control device.

18. The circuit as recited in claim 17, wherein a control signal enables the output means to indicate the status signal.

19. The circuit as recited in claim 18, wherein a control signal maintains the status signal generated by the status means and clears the status signal indicated by the first output means.

20. The circuit as recited in claim 19, wherein a control signal clears the status signal generated by the status means.

* * * * *